United States Patent [19]

Kirschey

[11] 4,385,893

[45] May 31, 1983

[54] ELASTIC SHAFT COUPLING

[76] Inventor: Gerhard Kirschey, Ittertaler Str. 52, D-56 Wupperal 11, Fed. Rep. of Germany

[21] Appl. No.: 199,833

[22] Filed: Oct. 23, 1980

[30] Foreign Application Priority Data

Oct. 24, 1979 [DE] Fed. Rep. of Germany ....... 2942874

[51] Int. Cl.³ ................................................ F16D 3/64
[52] U.S. Cl. ........................................ 464/17; 464/73; 464/76; 464/89
[58] Field of Search ...................... 64/9 R, 11 R, 11 F, 64/14, 23, 27 R, 27 NM; 464/17, 73–76, 87, 89

[56] References Cited

U.S. PATENT DOCUMENTS

| 3,406,536 | 10/1968 | Domer | 64/14 |
| 3,638,454 | 2/1972 | Croset | 64/14 |
| 3,678,708 | 7/1972 | Ernst et al. | 64/14 X |
| 3,727,431 | 4/1973 | Yokel | 64/14 X |
| 4,092,837 | 6/1978 | Gebauer et al. | 64/14 X |
| 4,249,396 | 2/1981 | Ziegler | 64/14 X |

FOREIGN PATENT DOCUMENTS 2706479 8/1978 Fed. Rep. of Germany .......... 64/14

Primary Examiner—John Petrakes
Attorney, Agent, or Firm—Karl F. Ross; Herbert Dubno

[57] ABSTRACT

An elastic shaft coupling of the disk type in which the inner member is connected to one shaft and is affixed to an annular elastic (rubber) member by vulcanization. The rubber member is provided with an array of formations interdigitating with complementary formations of the outer member which is connected to the other shaft. The rubber body is retained against the outer member by pure radial precompression between the inner and outer members and progressively decreases in cross section radially outwardly, i.e. with increasing diameter, to maintain the shear stress substantially constant within the rubber member.

8 Claims, 8 Drawing Figures

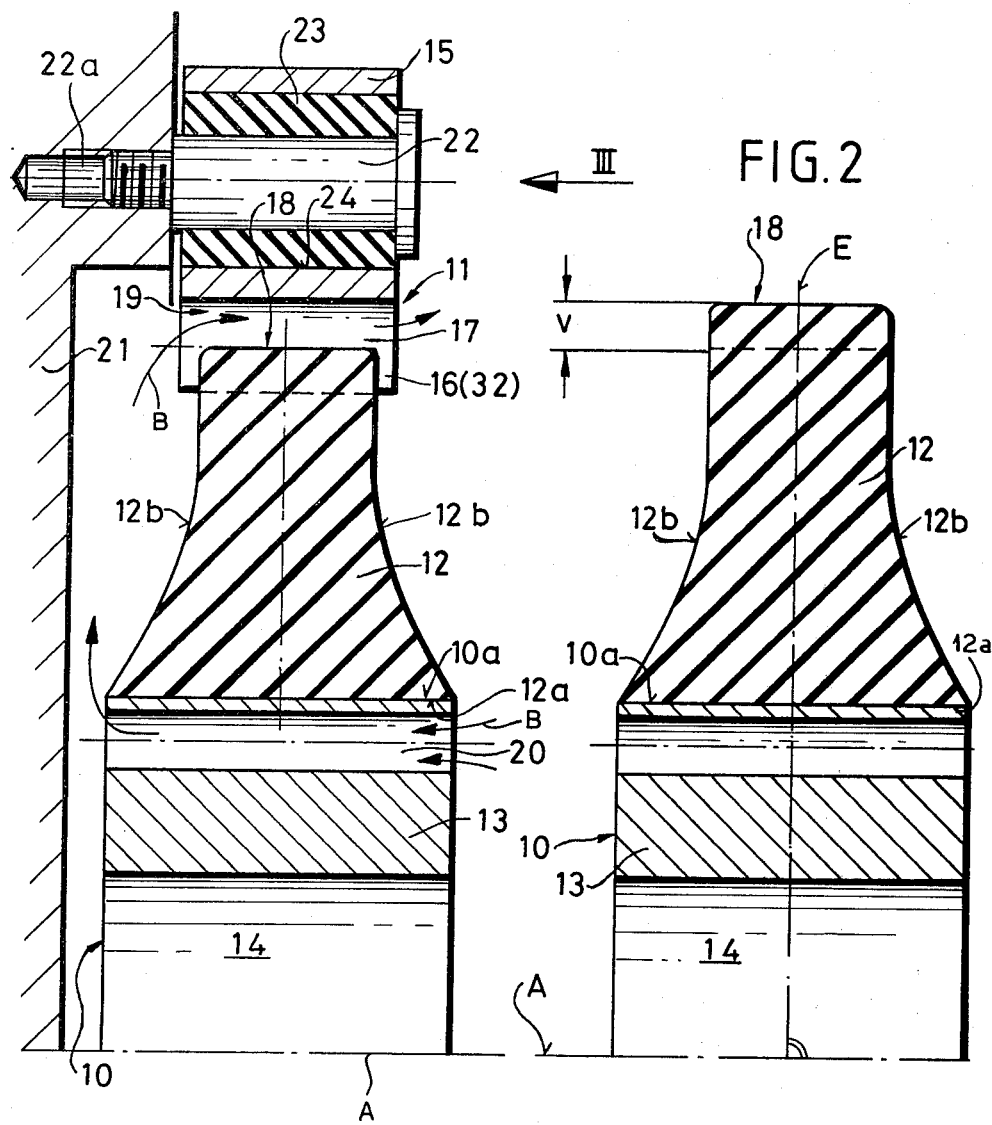

ELASTIC SHAFT COUPLING

FIELD OF THE INVENTION

My present invention relates to an elastic or flexible shaft coupling and, more particularly, to a so-called disk-type shaft coupling in which a rigid inner member is connected to one shaft, a rigid outer member is connected to another shaft or rotatable body, and an elastomeric element bridges the two members which are coplanar with the element.

BACKGROUND OF THE INVENTION

In the interconnection of shafts for the joint rotation thereof or torque transmission therebetween, elastic or flexible couplings are generally provided to compensate for inexact alignment of the shaft axis and to absorb perturbations in the torque transmission therebetween.

While such devices are known in various constructions and configurations, an important number of them are of the so-called disk type wherein a rigid annular inner member is affixed to one shaft, a rigid annular outer member is affixed to the other shaft and the two members are bridged by an annular flexible element, e.g. of an elastomeric material such as rubber, such that the two members and the element are generally coplanar. The two members are angularly fixed to the respective shaft, i.e. rotate therewith.

In one conventional construction of this type, the inner coupling half or member is provided with a rigid shoulder to which the elastomeric member is clamped while the external periphery of the elastomeric member is toothed and engages in an array of internal teeth of, for example, a flange ring affixed to a motor flywheel.

A disadvantage of the clamping of the elastomeric coupling element in the region of its inner diameter is the reduction in the effective elastic length, i.e. the radial dimension of the element over which it remains yieldable, thereby increasing the tendency to wear and introducing problems of force transmission in the transition zones. Since the coupling element is subjected to varying force conditions, its life is limited.

It is also a disadvantage that the clamping arrangement is difficult to accomplish in some cases and contributes to a high cost of the coupling. Since the only connection along the outer periphery is with arrays of teeth which can have play between them, wear at this point is also a problem and there is always a danger that the teeth of the elastomeric element may jump past the teeth of the outer coupling member.

To avoid these problems it has also been proposed to vulcanize a rubber ring to inner and outer rigid rings, thereby forming the coupling. While this construction is indeed simpler and avoids the problems which arise with clamping systems, the double-sided vulcanization of the elastomeric coupling element to the inner and outer rings is relatively costly.

Furthermore, and possibly of even greater importance, is the fact that vulcanization of the elastomeric element to the inner and outer rigid members of the coupling greatly limits the degree of angular adjustability between the two members and the angle through which the two members can be relatively twisted within the elasticity limits of the elastomeric member.

Additionally, experience has shown that the limiting stress is rapidly reached with relatively small angular offsets of the two members thereby reducing the versatility of the device.

In order to increase the angular offset which can be sustained without exceeding the elastic limit of the elastomeric member, it has been proposed to provide a coupling with a plurality of elastic elements each being disposed between a rigid inner ring and a rigid outer ring so that the space between inner and outer members contains several elastomeric rings separated from one another by rigid rings to which the elastomeric rings are vulcanized in a concentric manner.

Where vulcanization to intermediate rings is provided, the contact surfaces may be frustoconical and of opposite convergence with the elastomeric elements being clamped to the ring by axial forces. Because of the frustoconical surfaces and the axial pressure, the elastomeric elements may be under radial prestress which increases the durability of the elastomeric element and permits the desired angular offset to be sustained. The key disadvantages of such arrangements are the large number of vulcanization joints and their high cost of fabrication and the complexity of forming the coupling and installing same. In general, such shaft couplings are prohibitively expensive.

Finally, mention may be made of an elastic shaft coupling in which the elastomeric coupling element, which is not under prestress, has a frustoconical configuration. This type of coupling does not provide an angular offset which is sufficiently large for all purposes, especially when it is of compact configuration and has the characteristic that torques applied to it are converted into axial forces which are disadvantageous and to be avoided.

OBJECTS OF THE INVENTION

It is the principal object of the present invention to provide a shaft coupling for the purposes described which has, in spite of a simple, compact and inexpensive construction, high reliability and durability, and also permits the elastic angular offset between the inner and outer members to be substantial.

Another object of my invention is to provide a disk-type shaft coupling of high flexibility, even in a compact construction, with excellent torque transmission and freedom from the conversion of applied torques into axial forces.

Still another object of this invention is to provide a shaft coupling of high versatility and low cost which avoids the disadvantages enumerated above of earlier shaft couplings.

SUMMARY OF THE INVENTION

I have now found that it is possible to provide an inexpensive, reliable, durable and flexible elastic coupling for two shafts which avoids the disadvantages of earlier systems, by forming this coupling of a rigid inner member affixed to one shaft, a rigid outer member affixed to the other shaft and an elastomeric coupling element bridging these members and coplanar therewith, all of the members being angular, by:

(a) affixing only the inner peripheral surface of the elastomeric coupling element with the inner rigid member or hub by vulcanization;

(b) anchoring the elastomeric coupling element purely by radial precompression between the inner coupling member and the outer coupling member, against the outer coupling member in form-fitting relation; and (c) reducing the cross section of the elastomeric coupling element with increasing diameter substantially constantly or monotonically in the sense that a uniform shear stress within the elastomeric coupling element is provided within the latter at locations outwardly from the vulcanized surface to the surface at which the coupling element bears under the radial prestress against the outer member.

Since only the inner surface of the elastomeric coupling element is connected to a coupling member by vulcanization, an especially compact configuration at low cost can be obtained without materially reducing the elastic "length" of the coupling element and without creating critical transitions at which stresses may be concentrated or become nonuniform to decrease the durability of the coupling.

Since the coupling element is held against the outer member only by pure radial precompression between the inner and outer coupling members, the radial prestress permits the elastomeric coupling element to be stressed to a high degree without materially reducing its elastic properties in the direction of rotation. As a result, large elastic angular offsets are possible.

The progressive reduction in the cross section of the coupling element outwardly so as to maintain the shear stress within this coupling element substantially uniform over its entire cross section, also guarantees the high elastic angular offset which can be sustained even in a compact configuration. Since the zones of the elastomeric coupling element have practically the same characteristic, internal differences are not encountered and the durability of the device is considerable.

It is also contemplated, in accordance with this invention, to increase the cross section of the elastomeric coupling element in the region of the vulcanization zone above the proportionality relation described to enable the interface at which vulcanization is effected to be as large as possible.

According to a further feature of the invention, the interfitting formations along the outer periphery of the elastomeric coupling element and along the inner periphery of the outer member provide a play-free connection at least in the direction of rotation or the peripheral direction. It has been found to be desirable to make the cross section of the elastomeric element symmetrical about a cross sectional plane perpendicular to the axis and referred to herein as the transverse median plane through the coupling. The formations on the outer periphery of the coupling element and on the inner periphery of the outer member can be teeth which correspond in form to the teeth with which they are interdigitated. Alternatively, the formations on the outer periphery of the coupling element can be notches which engage axially extending pins of the outer member.

The elastomeric coupling element can be formed with a plug-type connection with the outer member, in which case the latter can have an entrainment ring connected by bolts or pins to the member which is affixed to the shaft and bores traversed by pins or the like to effect the connection.

The teeth of the elastomeric coupling element can bear upon a smooth-surfaced ring so that gaps are formed between the teeth to enable axial entraining elements to pass through these gaps for connection to the other shaft. Furthermore, the ring which surrounds the elastic coupling element can be bonded thereto under the radial prestress.

Advantageously, the inner coupling member, the outer coupling member and/or the region between the elastomeric coupling element and the ring can be provided with axially extending ventilation passages. In the latter case, it has been found to be advantageous to provide the gaps between the teeth of the outer ring with greater radial depths than the radial heights of the teeth of the elastomeric coupling element thereby forming the ventilation passages between the ends of the teeth of the latter and the roots of the gaps between the teeth of the surrounding ring. A guide plate can extend from the outer coupling member along, but spaced from, one flank of the elastomeric coupling element, in the form of an apron, to promote ventilation air flow. The flanks of the elastomeric coupling element can also be provided with ribs, projections or the like to promote air flow.

The coupling of the invention allows an extremely simple inner coupling member or hub to be provided, e.g. in the form of a simple cylindrical body, although the outer coupling body can also be of simple construction or of the flange type to which the ring is connected. The interengaged formations prevent the elastomeric coupling element from shifting angularly relative to this ring.

The mirror symmetrical configuration of the cross section of the coupling element not only allows it to be shaped readily but also ensures that no axial forces will result from the application of torque. It can have a comparatively short axial dimension and thus contribute to the compactness of the device.

BRIEF DESCRIPTION OF THE DRAWING

The above and other objects, features and advantages of the present invention will become more readily apparent from the following description, reference being made to the accompanying drawing in which:

FIG. 1 is an axial section through a first embodiment of a shaft coupling according to the invention;

FIG. 2 is a similar view showing the flexible coupling element and its hub prior to radial precompression;

SPECIFIC DESCRIPTION

Figure 3:
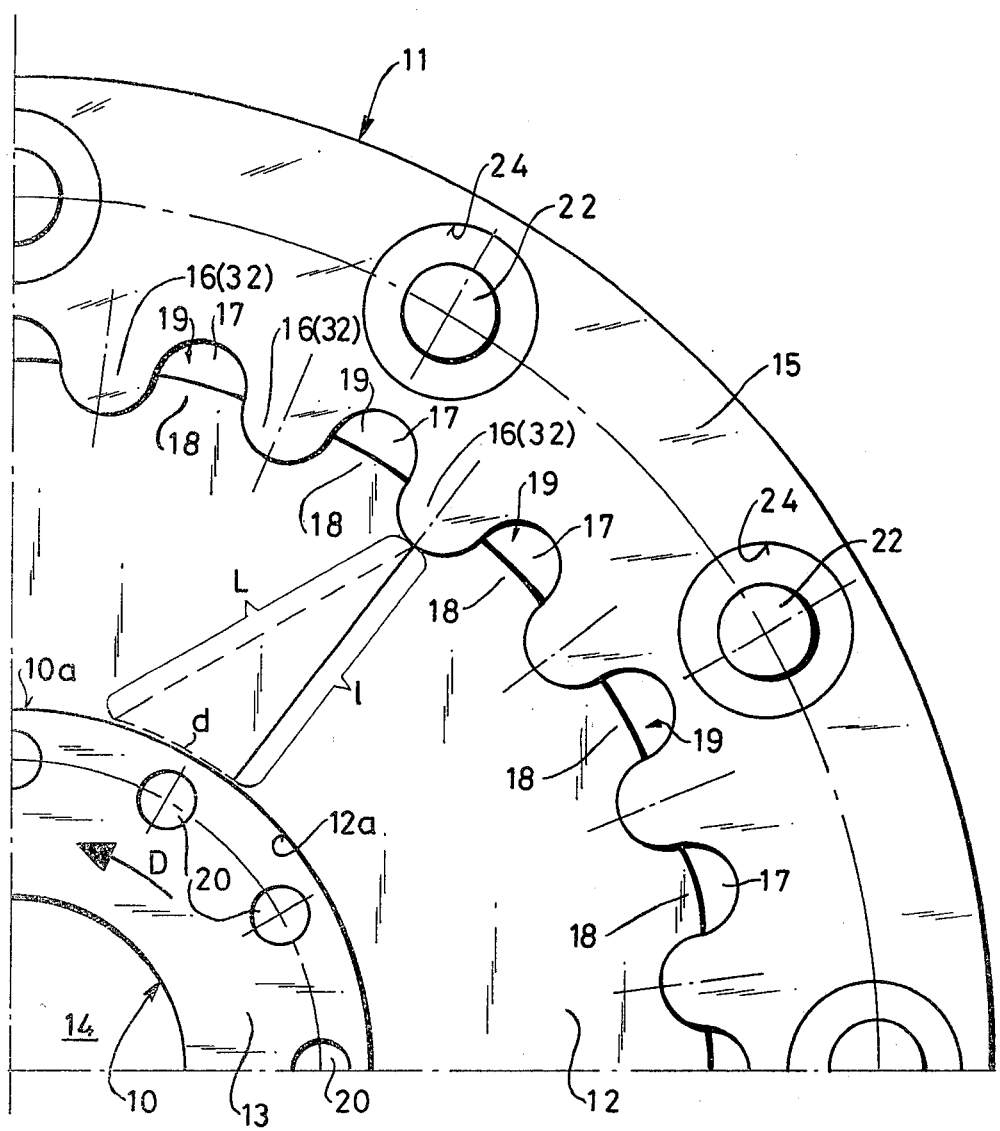
FIG. 3 is an end view in the direction of arrow III of FIG. 1.

In the drawing (especially FIGS. 1, 2 and 4 through 7) only the half of the coupling above the axis A has been shown.

In the embodiment of FIG. 1, the coupling comprises an inner rigid coupling half or member 10 which is keyed to a first shaft, and a rigid outer coupling half 11 which is connected to a second shaft, e.g. via a flange 21 as will be described in greater detail hereinafter. The two coupling members 10 and 11 are bridged by a generally circular elastic, preferably rubber, coupling element 12 such that the two coupling members 10, 11 and the elastomeric member 12 lie in a plane.

The inner coupling member 10 is formed as a hub 13 with a central bore 14 adapted to receive the shaft and has a cylindrical outer surface 10a which is affixed to the broadened inner cylindrical surface 12a of the elastomeric element 12 by vulcanization.

The outer coupling member 11 is an uninterrupted circular ring 15 which is formed (FIG. 3) with an array of internal teeth 16 with gaps 17 between them, the teeth 16 having rounded tips and flanks. In the gaps 17 between the teeth 16, teeth 18 on the periphery of the elastic coupling 12 engage.

As can be seen from FIGS. 1 and 3, the teeth 18 fill only about half of the gaps 17 so that ventilation passages are formed in the unfilled portions of these gaps.

This form-fitting connection of the outer periphery of the coupling element 12 and the inner periphery of member 11 is effected under radial prestress.

Before the assembly, the coupling element has an outer radius (compare FIGS. 1 and 2) which is greater by the dimension V than the radius of the coupling element in place within the ring 15. The periphery of the element 12 is pressed in as the two parts 12 and 15 are forced together to establish the degree of radial compression.

The axially facing flanks 12b of coupling element 12 have a curved configuration with a constant or monotonic curvature imparting a monotonically decreasing cross section or axial thickness to the element 12 with increasing diameter, i.e. radially outwardly.

The form of the flanks is selected so that at all points outwardly from the surface 10a, except in the region of the surface where the cross section is overproportionally increased, the shear stresses in the element 12 will be constant.

The radially effective prestressing force permits, within the elastic limit, an angular offset of the hub 13, which is assumed to be driven in the direction D while inertia retains the ring 15 against displacement, of a value d relative to the outer coupling half. An imaginary radius is shown at 1 and the point at which this radius meets the surface 10a, upon the offset d, establishes a line L representing the shift of the radius. The precompression force is thus at least equal to K x ΔL where ΔL is equal to L−1. Thus this stretching of the elastomeric element fully within its elastic limit generates a restoring force which is of corresponding dimension to eliminate the offset at standstill. This yielding is effected without a tensile stress so that the vulcanization zone is free from tension stresses. The radial prestress also increases the vibration and shock damping effected by the elastic element 12.

The inner coupling member 10 is provided with angularly equispaced axially extending bores 20 which form ventilation passages communicating as shown by the arrows B with the passages 19 so that air flows through the coupling and dissipates heat generated by the stresses applied to the coupling element 12.

The coupling of FIGS. 1 through 3 is axially assemblable as can be seen best from FIG. 1.

If it is assumed that the flange 21 is the flywheel on the crank shaft of a diesel engine and is provided with a plurality of angularly equispaced threaded bore 22a in an array coaxial with the axis A, the ring 15 can be secured to the flywheel by bolts 22 threaded into the bores 22a and traversing elastic sleeves 23 fitted into angularly equispaced axial bores 24 of the ring 15. The arrangement thus allows axial assembly of the coupling 11, 12, 13 before this assembly is affixed to the flywheel utilizing threaded bores 22a customarily provided therein for the shaft coupling.

As is apparent from FIG. 2, the coupling element 12 is of mirror symmetrical configuration with respect to a plane of symmetry E perpendicular to the axis A.

Figure 4:
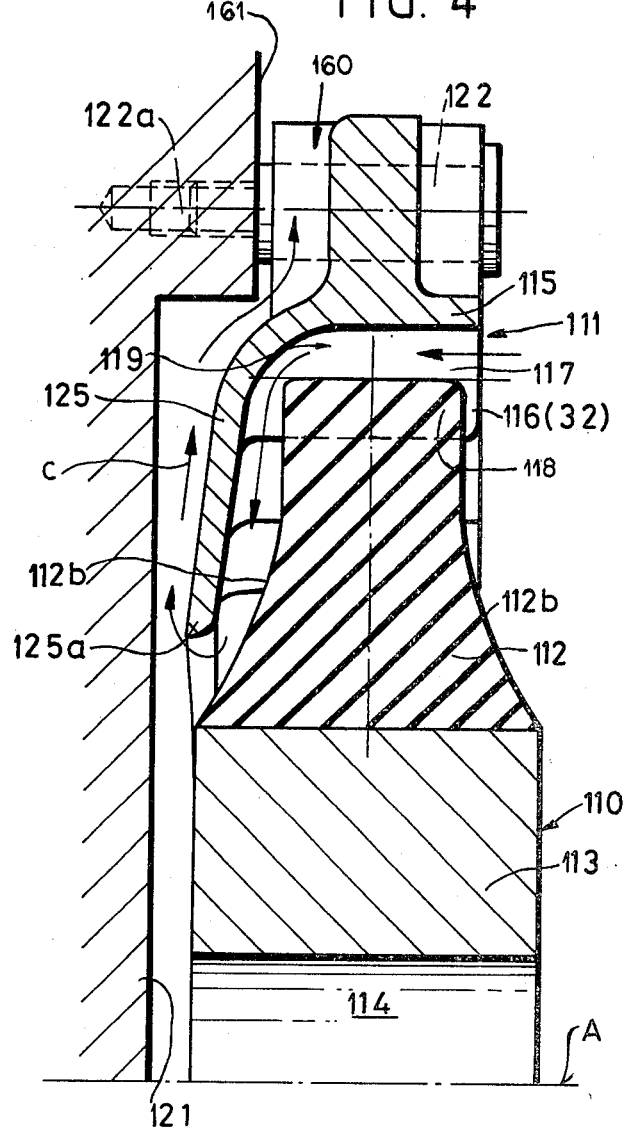
FIGS. 4 through 7 are sections similar to FIG. 1 but illustrating four other embodiments of the invention.

The embodiment of FIG. 4 differs from that of FIGS. 1 through 3 basically only in the configuration of the air passages and hence corresponding numerals are used to indicate parts equivalent to those in FIGS. 1 through 3 although distinguished by the hundreds digit.

In this embodiment, the hub 113 which accommodates the shaft in its bore 114, does not have axial ventilation passages but is vulcanized to the inner cylindrical periphery of the elastomeric element 112 with its monotonically curved flanks 112b. In this case, however, the outer ring 115, connected by bolts 122 in bores 122a of the flywheel 121, is formed with an apron 125 reaching inwardly along one of the flanks 112b of the coupling element 112 but spaced therefrom. The apron 125 is inclined to the axis A and terminates at an inner edge 125a spaced slightly from the hub 113 so that air is drawn through the gaps 117 in the outer coupling member 11 between the teeth 116 and 118 which form the flow passages 119.

The air is guided along the coupling element 112 (arrows C) and passes around the inner edge 125a and then radially outwardly through gaps 160 between the ring 115 and the end face 161 of the flywheel 121. The coupling thus acts as a centrifugal blower of the axial-intake radial outflow type for forced displacement of the air. It is important that the edge 125a lie close to the hub 113.

Figure 5:
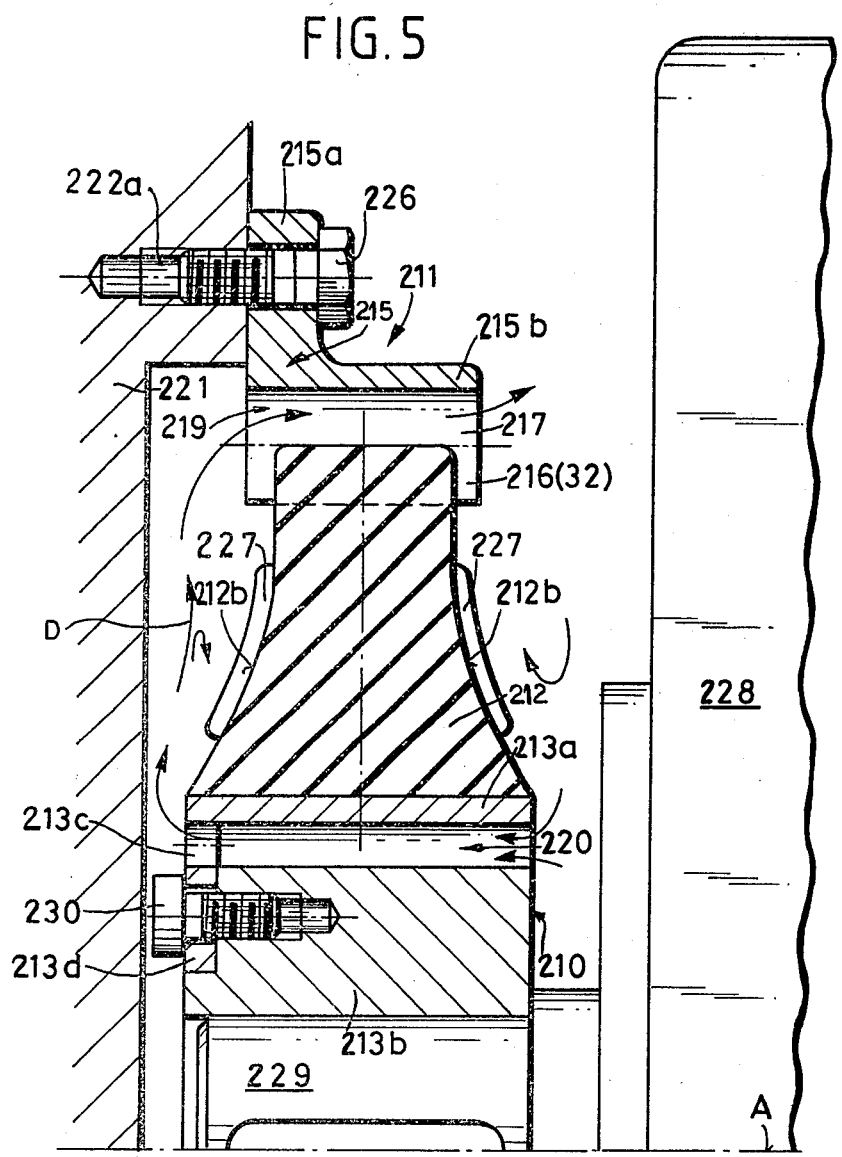

As can be seen from FIG. 5, which corresponds to FIGS. 1 through 3 except for the construction of the coupling element 212 and of the member 210 and the hub 213a, 213b 215 of the outer members 211 is connected by bolts 226 threaded into the bores 222a of the flywheel 221 via an annular flange 215a while the teeth 216 and the gaps 217 are formed on a ring portion 215b from which the flange projects.

The flanks 212b of the coupling element 212 are provided with ribs 227 which act as impellers to promote ventilation (arrows D) and also increase the surface area of the coupling element 212 to promote heat dissipation. This embodiment is used when the device must be employed close to a machine housing 228 whose shaft 229 is keyed to the inner hub 213b of member 210.

Member 210 is also designed to promote ventilation and instead of providing it with individual ventilation passages, an annular ventilation passage 220 is provided between the inner hub 213b and an outer hub 213a to which the coupling element 212 is vulcanized.

The outer hub 213a is cup-shaped and has an inwardly extending flange 213d connected by bolts 230 to the inner hub 213b and formed with radial ribs 213c connecting the flange to the cylindrical portion of the hub 213a. Thus cooling air can traverse the passage 220, flow along the rear flank 212b of coupling element 212 and leave via the passage 219 while additional cooling air is circulated or induced into turbulence by the ribs 227 to dissipate heat from the coupling.

Figure 6:
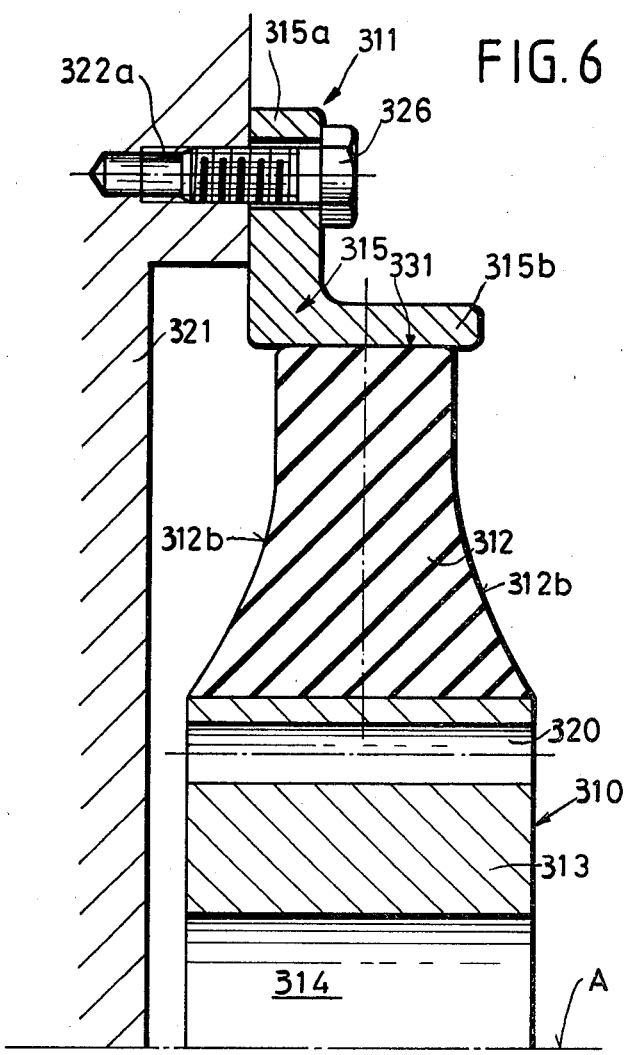

In the embodiment of FIG. 6, the outer member 311 comprises a flange ring 315 which is attached by bolts 326 screwed into bores 322a, to the flywheel 321. The cylindrical portion 315b which joins the flange 315a in coated with an adhesive layer 321 to which the outer periphery of the elastomeric element 312 is bonded under its radial compression. As in FIGS. 1 through 3, the coupling element 312, which is bonded engagement instead of form-fitting engagement with the outer element, has monotonically curved flanks 312b and an inner member 310 whose hub 313 is vulcanized to member 312 and, is formed with passages 320 and accommodate the shaft in bore 314.

Figure 7:
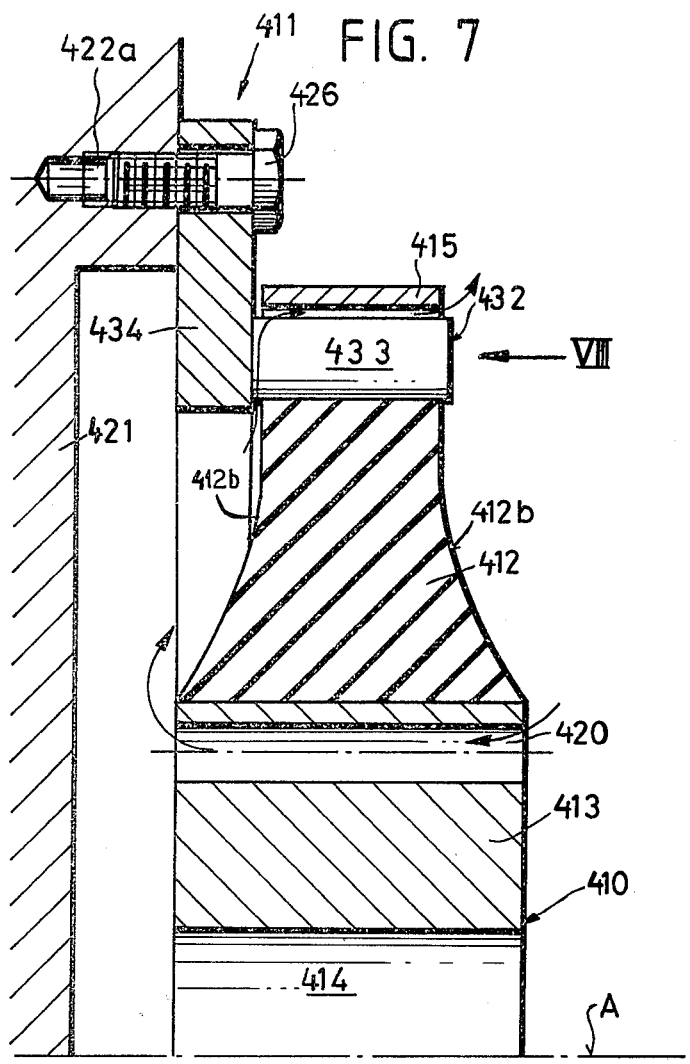
Figure 8:
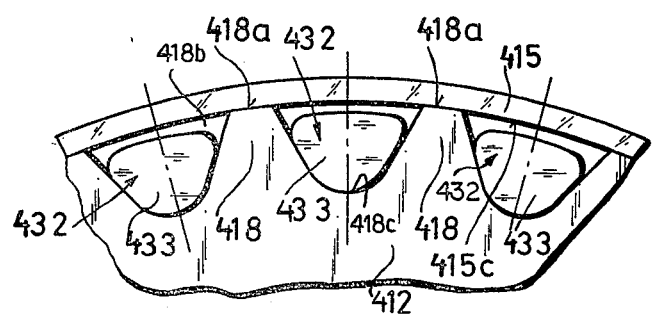
FIG. 8 is a partial elevation in the direction of arrow VIII of FIG. 7.

In the embodiment of FIGS. 7 and 8, the ring 415 is not directly attached to the flywheel 421 but supports the outer ends 418a of the teeth 418 of the elastomeric element 412 while axial entrainers 432 in the form of pins or bolts 433 extend into the gaps 418b between the teeth 418.

The ends 418a can be bonded to the inner surface 415c of the ring 415 under radial compression or merely frictionally engage the latter whereas the entrainers 432 project axially from a ring 434 which is secured by bolts 426 in the bores 422a of the flywheel 421. The outer member 411 thus includes the assembly 415, 433, 434. The radial precompression also holds the bottom 418c of each gap 418b against the inwardly tapering pins 433 without play.

All embodiments thus provide a relatively long elastic length for the coupling element 12 in a highly compact comparatively inexpensive shaft coupling having a high elastic offset angle.

I claim:

1. A shaft coupling comprising:
   a rigid inner coupling member connectable to a shaft;
   an annular elastic coupling element vulcanized only to said inner member and surrounding same and of a cross section decreasing readially outwardly therefrom such that the shear stress in said element is uniform at all locations outwardly from said inner coupling member except at most in the region thereof;
   a rigid outer coupling member surrounding the outer periphery of said coupling element and in engagement therewith only under radial precompression of said coupling element without vulcanization, said element being connectable to a rotatable body independently of the outer coupling member; and
   further comprising interengaged formations provided on an inner periphery of said outer coupling member and on said outer periphery of said coupling element forming a connection therebetween free from play at least in a peripheral direction, said coupling element being mirror symmetrical about a transverse median plane perpendicular to an axis of the coupling,
   said outer periphery of said coupling element being toothed and said body being provided with an array of entrainers engaging in gaps between teeth of said outer periphery of said element.

2. The coupling defined in claim 1 wherein said entrainers are pins extending axially and received in said gaps, said teeth bearing against a ring surrounding the outer periphery of said element.

3. The coupling defined in claim 1 wherein said outer coupling member is provided with axially extending bores and bolts forming an axially assemblable plug-type connection with said body.

4. A shaft coupling comprising:
   a rigid inner coupling member connectable to a shaft;
   an annular elastic coupling element vulcanized only to said inner member and surrounding same and of a cross section decreasing radially outwardly therefrom such that the shear stress in said element is uniform at all locations outwardly from said inner coupling member except at most in the region thereof;
   a rigid outer coupling member surrounding the outer periphery of said coupling element and in engagement therewith only under radial precompression of said coupling element without vulcanization, said element being connectable to a rotatable body independently of the outer coupling member; and
   further comprising interengaged formation provided on an inner periphery of said outer coupling member and on said outer periphery of said coupling element forming a connection therebetween free from play at least in a peripheral direction, said coupling element being mirror symmetrical about a transverse median plane perpendicular to an axis of the coupling,
   said outer periphery of said element is bonded to said outer member by an adhesive layer.

5. The coupling defined in claim 1, claim 2, claim 3, or claim 4 wherein at least one of said members is provided with axially extending passages for ventilation of the coupling.

6. The coupling defined in claim 5 wherein said passages are formed between teeth on said coupling element and said outer member.

7. The coupling defined in claim 5, further comprising an apron extending from said outer member inwardly along at least one flank of said coupling element for guiding ventilation air therealong.

8. The coupling defined in claim 5, further comprising formations on flanks of said coupling element for inducing the flow of air therealong.

* * * * *